S. P. NOE.
MAXIMUM PRESSURE SAFETY INFLATING TIRE GAGE.
APPLICATION FILED MAY 28, 1914.
1,137,521.
Patented Apr. 27, 1915.
2 SHEETS—SHEET 2.
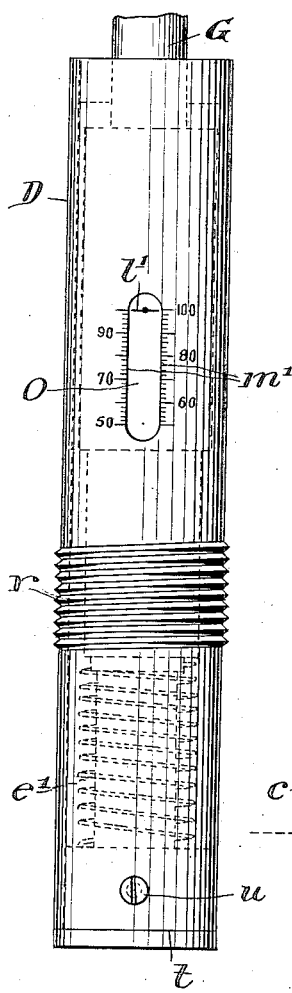
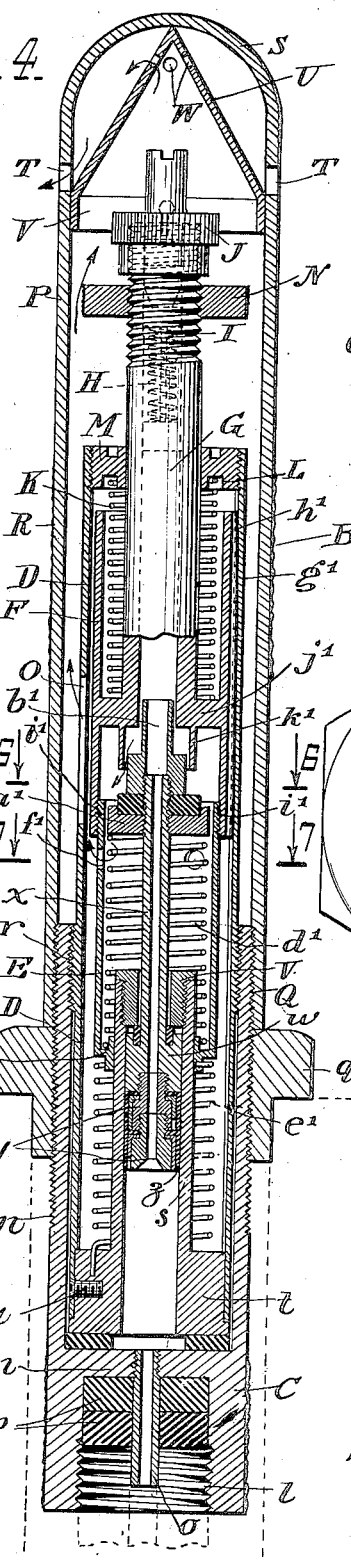
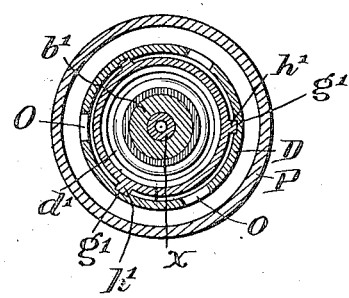
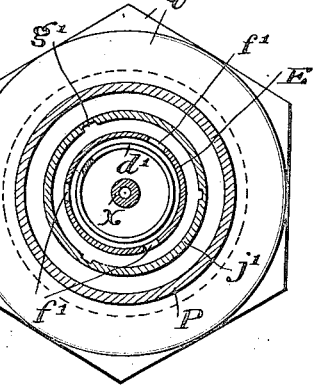
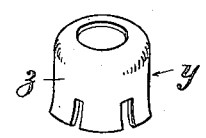
WITNESSES
INVENTOR
Seaman P. Noe
BY
ATTORNEYS

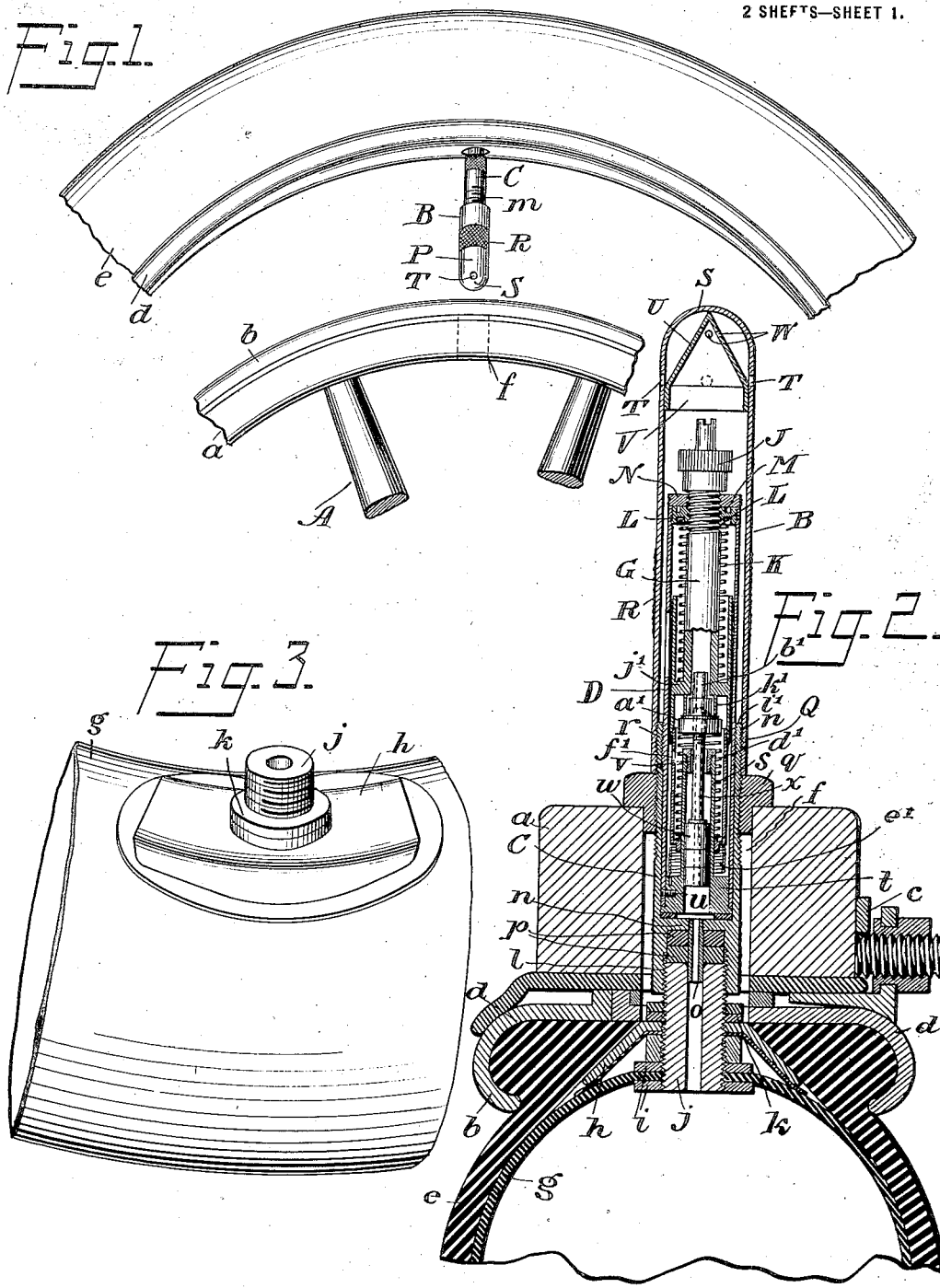

UNITED STATES PATENT OFFICE.

SEAMAN PARTERSUS NOE, OF OCEAN GROVE, NEW JERSEY.

MAXIMUM-PRESSURE SAFETY INFLATING TIRE-GAGE.

1,137,521.

Specification of Letters Patent.

Patented Apr. 27, 1915.

Application filed May 28, 1914. Serial No. 841,531.

*To all whom it may concern:*

Be it known that I, SEAMAN P. NOE, a citizen of the United States, and a resident of Ocean Grove, in the county of Monmouth and State of New Jersey, have invented a new and Improved Maximum - Pressure Safety Inflating Tire-Gage, of which the following is a full, clear, and exact description.

This invention has special reference to the inflation of pneumatic tires or other bodies adapted to receive air under pressure and means for indicating the pressure of the air within such tires or bodies, and for this purpose I provide an improved maximum pressure safety inflating tire gage.

The primary object of the invention is to provide a device of the character named which will prove a certain and positive means for insuring the exact pressure in an inner tube of a pneumatic tire or the like that such tire is designed to carry, and to automatically indicate at all times the pressure within the tire and especially the maximum pressure which the tire is adapted to withstand.

Another object of the invention is to provide a gage of the class described which can be attached to any inner tube, inserted through the felly of the wheel and inflated through in the same manner as the present valve, and which remains on the inner tube until replacement of the tube is desired, in which case the gage is removed and applied to the new or repaired inner tube which replaces the one damaged or otherwise worn out.

A still further object of the invention is to provide an improved maximum pressure safety inflating tire gage which, due to its size and construction will appear like or simulate an ordinary inflating valve from the exterior and which, due to a novel attachment thereof to the inner tube and the felly of an automobile wheel, will permit the tire to be applied to a felly with the gage attached to the tire so that no disadvantage in the assemblage of the parts of a wheel is experienced while great facility is served in the attachment and removal of the gage to and from the felly and inner tube.

A still further and important object of the invention resides in the provision of a gage of the character described which includes such parts as to permit the inflation of a tire in the ordinary way and in which certain working parts composing the same will indicate the pressure within the tire as it gradually approaches a maximum degree, provision being also made to prevent the escape of the air until a maximum pressure has been reached when, due to a novel assemblage of parts, excess pressure will be relieved either due to inflation beyond a maximum pressure or due to excess internal pressure which may, for instance, result from slight expansion of the air in the inner tube or body containing air under pressure.

Among other objects, it is also an object of this invention to provide an improved gage having a cap of novel construction so that the entrance of water or moisture into the working parts of the valve is obviated, and thus not only are the working parts protected from injury or deterioration but their positive operation as well as prolonged useful life is insured.

With the above and other objects in view, the invention resides in the peculiar combination and arrangement of parts to be hereinafter more fully described, illustrated and claimed, it being also an object to provide a device which is simple in construction, durable and efficient.

Reference is to be had to the accompanying drawings forming a part of this specification, in which similar characters of reference indicate corresponding parts in all the views, and in which—

Figure 1 is a perspective view showing fragmentary portions of a tire and felly, the tire being equipped with the improved maximum pressure safety inflating tire gage and in position to enter an aperture of the felly in the assemblage of the parts composing an automobile wheel; Fig. 2 is an enlarged longitudinal sectional view of the improved tire gage and its securing parts attached to a wheel, a fragmentary portion of which is also shown in section; Fig. 3 is a perspective view of a fragmentary portion of an inner tube equipped with a saddle and a threaded attaching part for application of my improved tire gage thereto; Fig. 4 is an enlarged vertical sectional view of the tire gage showing the parts in the positions which they assume due to excessive inflation or interior pressure beyond a maximum, in contra-distinction to the position of the parts shown in Fig. 2 under normal conditions, or at or below a maximum pressure; Fig. 5 is an elevation of a portion of the gage forming the casing thereof inwardly of the cap of the gage; Fig. 6 is a cross sectional view taken on the line 6—6 of Fig. 4; Fig. 7 is a cross sectional view taken on the line 7—7 of Fig. 4; Fig. 8 is a detail perspective view of a part of an expansion cup washer employed with the device.

To those acquainted with the art of pneumatic tires, the necessity for proper attention to the tires in order to obtain a maximum service has long been recognized and particularly proper inflation of a tire to the pressure which it is constructed to withstand. For instance, nearly every tire that is manufactured, depending upon its dimensions and use, is adapted to withstand a certain number of pounds pressure per square inch when inflated in order to provide for the best wearing qualities, but should a tire which is adapted to withstand one pressure be inflated at a lesser pressure or at a greater pressure, the life and wearing qualities of the tire are thus reduced, inasmuch as tires insufficiently inflated will be run under an unnatural strain as distinguished from the position of the tire when inflated to the proper pressure, so that the excessive flexing of the tire, especially at the side portions or beads, will cause the same to crack or break so that if the tire should be subsequently properly or excessively inflated, a blow-out will almost invariably result. On the other hand, excessive inflation results in improper absorption of the shocks incident to the travel over uneven road surfaces and in this case, as well as the foregoing, shocks are transmitted to the car and form a particular detriment to a motor and the minute parts composing the same and which require accurate adjustment for their best operation. It is therefore an object of the present invention to obviate this and many other objectionable features incident to tire trouble and also to obviate the necessity for refinements of construction and adjustment usually found in the ordinary tire gages and also to insure reliable positive operation of the device under all the exigencies of practical everyday use.

In carrying out my invention portions of an automobile are illustrated with the improved tire gage applied thereto, and in the drawings the wheel as a whole is indicated by the letter A and the felly thereof by the letter $a$, the same being shown provided with a demountable rim $b$ and securing plates $c$ for securing the demountable rim in position by engagement with the clencher portions $d$ of a tire $e$. The felly and rim are provided with alined apertures producing an opening $f$ for receiving the improved gage B which is attached to the inner tube $g$. This attachment is effected through the medium of a saddle $h$ which is clamped to the inner tube by fastening members $i$ disposed inwardly and outwardly of the inner tube and threaded exteriorly to an attaching stub $j$ having a bore opening into the tube but projecting from the tube a considerably lesser distance than the usual attaching members.

No claim is made for the method of attaching the tire to the wheel as any other improved method of attachment may be employed, but novelty is held to reside in the use of a threaded attaching stub which projects slightly through the demountable rim and terminates near the peripheral edge of the felly, as is more clearly shown in Fig. 2 of the drawings. The attachment of the saddle to the stub is effected by securing members $k$ disposed on either side of the saddle and threaded on to the stub so that the attaching stub is thus securely attached in such a manner as to prevent breaking or mutilation of the inner tube.

It will be observed that the attaching stub extends loosely into the opening provided by the alined apertures in the felly and rim so as to provide for the free passage of the gage through the opening with the parts in the position shown in Fig. 1 of the drawings as through the medium of an attaching barrel C which is interiorly threaded as shown at $l$ for this purpose. This barrel has a knurled portion exteriorly near its end attached to the stub but is exteriorly threaded there beyond as shown at $m$, the wall adjacent to the knurled or unthreaded part being considerably thicker than the remaining portion to add rigidity to the attachment. A partition wall $n$ is located at the juncture of the two walls and is apertured to receive the threaded end of a small tube $o$ which acts as a centering member to engage in the bore of the attaching stub with the end of the stub contacting with resilient washers or the like $p$ mounted around the tire to form an air-tight joint. The exterior threads $m$ are employed in order to hold the barrel rigid with respect to the felly and rim so as not to exert excessive strain upon the union between the attaching stub and the inner tube, and for this purpose a flanged nut $q$ is engaged on the barrel so that its flange will enter the opening in the felly from the inner face of the latter while the wrench engaging portion of the nut will contact with the inner face of the felly, thus preventing inward pressure against the inner tube.

Attached to the barrel and extending into the same is a casing D the attachment being effected by making the lower portion of the casing slightly smaller than the upper part and connecting the parts by exterior threads or otherwise, as shown at $r$, so that the casing will project upwardly from the barrel with its exterior wall in substantial alinement with the interior wall of the latter. Mounted in the lower end of the casing and extending upwardly into the same is a sleeve s, so as to provide a surrounding interior space between it and the casing, while the lower end of the sleeve is provided with an enlargement t to engage an interior shoulder of the casing at its upper end while the enlargement is flanged at its lower end to engage the lower end of the casing when the parts are connected as by a fastening member or screw u passing through the casing and engaging the enlargement in order to hold the sleeve stationary. The upper end of the sleeve has an apertured plug v threaded therein so as to provide an internal shoulder adapted to contact with a cushioning washer mounted in an annular groove in the upper face of an enlargement w of a piston x, the said piston having a longitudinal bore and carrying a pair of expansion cup washers y in its lower end to form an air-tight connection with the inner wall of the sleeve in which the piston is movable, the expansive parts of the washer being of spring metal.

It will be observed that each washer has an exteriorly threaded extension which engages in a threaded recess in the enlargement of the piston or uppermost metallic portion while the cup-shaped washers z fit over the metallic portions to engage the threaded parts and to extend outwardly around the peripheral faces of the metallic portion to provide a uniform contacting surface to insure an air-tight contact. The piston is thus limited in its displacement inwardly with respect to the gage and wheel but is in turn exteriorly threaded at its free end for engagement by a flanged washer carrying disk a' which with its washer is threaded on to the piston and retained thereon by a tip b' having an enlarged interiorly threaded attaching portion for engagement with the threaded end of the piston.

Slidably mounted on the sleeve is a cylinder E which has an inwardly extending flange c' at its lower end extending upwardly and downwardly, the upwardly extending portion serving for the retention of a coiled spring d' in position at its lower end. This coiled spring is mounted in the cylinder E, encircling the upper end of the sleeve and contacts with the disk carried by the upper end of the sleeve for a purpose to be hereinafter more fully described. Fixed to the depending portion of the flange at the bottom of the cylinder is a coiled spring e', such spring encircling the reduced portion of the sleeve and having its lower coil attached to the enlargement of the sleeve so as to be capable of expansion and contraction between these parts. The disk s' loosely fits in the upper end of the cylinder so as to provide a surrounding space for the escape of air as will be more particularly pointed out, and said cylinder is also provided with a plurality of openings f' adjacent to its upper end for the further escape of the air, and as shown in Fig. 7 of the drawings three of such openings are preferably provided.

The casing D is splined longitudinally of its interior wall, as shown at g', three of such splines being preferably employed to receive corresponding projections h' throughout the length of an upper section F constituting with the cylinder or lower section E to which it is detachably connected as shown at i', a movable element which due to the engagement of the projections with the splines serves to prevent rotation of said parts independent of the casing while still permitting longitudinal movement thereof with respect to the casing. The section F is provided with a partition wall j' near its bottom portion which is in turn provided with a depending flange k' coöperating with the washer carried by the disk a' to open or close the passage between the flange and the enlargement of the tip which extends thereinto. The tip proper extends upwardly into a valve stem G which projects upwardly from the partition and which in its bore carries an ordinary inflating valve H and which is exteriorly threaded as shown at I for the application of a valve cover J thereto. A coiled spring K encircles the valve stem and is received in the space between the stem and the wall of the upper section of the movable element, while the upper end of the spring engages a groove L in a plug M which is threaded into the casing and which is preferably provided with spanner openings or the like to facilitate its attachment. A grasping ring N is threaded on the stem and is exteriorly knurled to permit a tight grip to be had thereon so as to prevent the movable element from pulling upward and exerting strain on the springs while the tire is being inflated through the inflating valve and gage or in removing the inflating tube from the stem.

The casing D is provided with a plurality of openings O preferably three in number and equi-distantly spaced apart alternately between the splines or longitudinal grooves in the inner wall of the casing, and the section F of the movable element adjacent to this opening is provided with an indication mark l', while the opposed edges of the openings are graduated as shown at m' to indicate the varying degrees of pressure of the air within the tire and having indications of such degree as to indicate the maximum pressure which the tire is adapted to withstand and with which the particular gage is adapted for use.

A cap P is provided for the gage to inclose the working parts and is threaded exteriorly of the barrel as shown at Q so as to render it readily removable. The cap is knurled exteriorly, as shown at R, and is further provided at its closed free end S which is rounded with means to prevent the entrance of water or moisture interiorly of the cap to interfere with the operation of the gage. For this purpose the cap is provided with a plurality of openings T, preferably three in number and of minute diameter while a hollow cone U is through the medium of a cylindrical portion V secured to the inner wall of the cap with the apex of the cone substantially in contact with the end wall of the cap. The cone is provided with a plurality of openings W near its apex to permit the outlet of air in a manner to be hereinafter more fully described, and the cone is so positioned with relation to the openings T that when the closed end of the gage is upright and positioned at the lowermost portion of a wheel which happens to be passing through a puddle of water, any water which might pass through the openings will be caused to drain therefrom and thus prevented from passing through the openings W.

In the operation of the device the parts are normally in the position shown in Fig. 2 of the drawings, the piston $x$ being in a receded position and the expansive spring $d'$ operating to compress the contractile spring $e'$ which is weaker than the aforesaid spring, while the spring K, which coöperates with the contractile spring and against the spring $d'$ to normally hold the piston and movable element in the receded position, is normally expanded. In this manner the flange $k'$ is held seated against the washer forming a seat in the disk $a'$ and the springs are made of such tension or adjustment due to the adjustable connection of the parts positioned at the ends of the springs as to hold said parts seated when the tire is inflated to any degree of pressure generally computed in pounds per square inch up to the maximum pressure which the particular tire is adapted to withstand, and in the present instance we will suppose this pressure to be 100 pounds per square inch. The compressed air in the tire is then free to escape through the tube, through the bores of the piston and tip and into the stem G, but the inflating valve will prevent the escape of the air unless it is depressed intentionally and no escaped air can take place between the flange $k'$ and its valve seat. If, however, the internal pressure of the tire and within the inner tube thereof should be excessive, in the present instance greater than 100 pounds per square inch, either due to slight expansion of the air or excessive inflation, the piston will be moved forward to compress the spring $d'$ and simultaneously expand the springs $e'$ and K by pressure against the inflated valve in the stem causing a forward movement of the movable element constituted by the parts E and F. In this manner the spring $d'$ will be compressed between the flange $c'$ of the section or cylinder E and the disk $a'$ while the piston through the medium of its cushioned enlargement will contact with the plug $v$ and forward movement of the movable element will disengage the flange $k'$ from its seat so that the excessive air will escape there-between, then between the disk $s'$ and the cylinder or section E, through the openings $f$ and then through the openings O to pass between the casing and the cap of the gage and finally through the openings in the cone and out through the openings T, all as indicated by the arrows in Fig. 4 of the drawings. As the tire is inflated and the movable element is shifted due to outward movement of the piston while the flange $k'$ is still in contact with its seat, the indication $e'$ will coöperate with the graduations $m'$ to indicate the pressure of the air and due to the provision of a plurality of such indication marks, the pressure can be inspected very readily by moving the cap without the necessity of getting under the automobile or in any inconvenient place depending upon the body to which the gage is applied.

From the foregoing description in connection with the accompanying drawings it will be seen that a maximum pressure safety inflating tire gage has been provided which does away with the nuisance of having to remove the pump connection in order to know the exact air pressure within the tire, prevents the inner tube from shifting or creeping by reason of the particular attachment specified, permits a tire to be properly inflated in the dark without having to strike matches, flash a light or carry the gage to the headlight, and provides a device which will work accurately at any angle of the wheel from three positions. Furthermore, a gage constructed as specified with a cap as described prevents dust, oil, dirt and other foreign matter injurious to rubber from entering the inner tube or interfering with the operation of the working parts, and by soldering the plug M in position access to the working parts is prevented and the device is thus rendered foolproof, and at the same time the device is not affected by sudden road jars or shocks due to the travel of the vehicle over uneven road surfaces.

Having thus described my invention, what I claim as new and desire to secure by Letters Patent is:—

1. The combination with a body to be inflated and to withstand a predetermined degree of pressure; of a gage attached thereto and including an inflating valve at the outer end thereof, said valve permitting inflation of the body through the gage, and means inwardly of the inflating valve and forming a part of the gage to permit the discharge of air when the pressure in the tire exceeds the maximum, said means including in part a piston actuated valve normally held in closed position by the internal pressure of the tire and automatically opened upon the existence of excessive pressure in the tire to permit the escape of air until the proper pressure has been reached.

2. The combination with a body to be inflated and to withstand a predetermined degree of pressure; of a gage attached thereto and including an inflating valve permitting inflation of the body through the gage, means to indicate the internal pressure of said body, and means to relieve the body of excess pressure beyond the maximum, said means forming a part of the gage and including a balanced valve normally held in closed position whereby the escape of air from the body is prevented but adapted to be shifted by pressure above the predetermined point and including an apertured shell for the escape of the air.

3. The combination with a tire gage including a casing having an attaching barrel and a cap threaded to the barrel; of a tire having an attaching portion adapted to extend through the felly of a wheel slightly beyond the peripheral edge of the felly and loosely fitted therein for attachment of the barrel with a surrounding space, and an attaching member threaded to the barrel and filling the space between the barrel and the surrounding wall of the aperture in the felly to hold the gage rigid.

4. In a maximum pressure safety inflating gage, the combination with a body adapted to be inflated and having an attaching part; of a barrel for connection with said part, a casing within the barrel, a pair of movable elements mounted within the casing, means permitting inflation of the body through the elements, and means coöperative with said movable elements to indicate the pressure within the body, said elements preventing escape of air from the body below a predetermined pressure while permitting the escape of the air under excessive pressure.

5. In a maximum pressure safety inflating gage, the combination with a body adapted to be inflated and having an attaching part; of a barrel for connection with said part, a casing within the barrel, a pair of movable elements mounted within the casing, means permitting inflation of the body through the elements, one of said elements and the casing having openings therethrough, said casing being graduated adjacent to the openings therein, and said elements when the tire is being inflated and until the inflation thereof beyond a maximum pressure preventing the escape of air, and means coöperative with said movable elements to cause said elements to disengage to permit the escape of air upon the pressure reaching a point beyond the maximum due to expansion, excessive inflation or otherwise and one of said movable elements coöperating with the graduation to indicate the internal pressure.

6. In a maximum pressure safety inflating gage, the combination with a body adapted to be inflated and having an attaching part; of a barrel for connection with said part, a casing within the barrel, a pair of movable elements mounted within the casing, means permitting inflation of the body through the elements, one of said elements and the casing having openings therethrough, said casing being graduated adjacent to the openings therein, and said elements when the tire is being inflated and until the inflation thereof beyond a maximum pressure preventing the escape of air, spring means between the casing and the movable elements and between the movable elements whereby pressure in the body below a maximum will not cause the escape of air while pressure above the maximum will result in movement of the parts against the action of the spring means to permit the escape of air through the openings, and a cap, engaged on the barrel over the casing and parts carried by the barrel.

7. In a maximum pressure safety inflating gage, the combination with a body adapted to be inflated and having an attaching part; of a barrel for connection with said part, a casing within the barrel, a pair of movable elements mounted within the casing, means permitting inflation of the body through the elements, one of said elements and the casing having openings therethrough, said casing being graduated adjacent to the openings therein, and said elements when the tire is being inflated and until the inflation thereof beyond a maximum pressure preventing the escape of air, spring means between the casing and the movable elements and between the movable elements whereby pressure in the body below a maximum will not cause the escape of air while pressure above the maximum will result in movement of the parts against the action of the spring means to permit the escape of air through the openings, said openings in the casing being equidistantly spaced apart and having graduations on either side thereof, one of said movable elements having an indication coöperating with said graduations whereby during forward movement thereof under the action of the air pressure the internal pressure of the body will be indicated, and a cap removably connected to the barrel to inclose said parts and prevent the entrance of foreign matter thereinto.

8. In a maximum pressure safety inflating tire gage, the combination with a tire to be inflated having an attaching stub; of a barrel threaded to the stub, a cap over the barrel, a casing rigidly fixed in the barrel, a sleeve held in the casing, a piston movable in the sleeve and having a bore therethrough having communication with the interior of the tire, a movable element slidable longitudinally in the casing and including an inflating valve through which the tire may be inflated upon the removal of the cap, and spring means preventing outward movement of the movable element below a maximum pressure which the tire is adapted to withstand but adapted to permit the escape of air by separation of the parts when the pressure in the tire has exceeded the maximum whereby over-inflation of the tire is obviated.

9. In a maximum pressure safety inflating tire gage, the combination with a tire to be inflated having an attaching stub; of a barrel threaded to the stub, a cap over the barrel, a casing rigidly fixed in the barrel, a sleeve held in the casing, a piston movable in the sleeve and having a bore therethrough having communication with the interior of the tire, a movable element slidable longitudinally in the casing and including an inflating valve through which the tire may be inflated upon the removal of the cap, said piston and movable element coöperating to form a continuous passage through the piston and inflating valve to normally prevent the escape of air between the valve and the tire, said parts including the movable element causing the cap having openings to permit the escape of air by separation of the piston and movable element under pressure beyond the maximum, and means to adjust the tension of said parts and the degree of action thereof under the air pressure.

10. In a maximum pressure safety inflating tire gage, the combination with a tire to be inflated having an attaching stub; of a barrel threaded to the stub, a cap over the barrel, a casing rigidly fixed in the barrel, a sleeve held in the casing, a piston movable in the sleeve and having a bore therethrough having communication with the interior of the tire, a movable element slidable longitudinally in the casing and including an inflating valve through which the tire may be inflated upon the removal of the cap, spring means preventing outward movement of the movable element below a maximum pressure which the tire is adapted to withstand but adapted to permit the escape of air by separation of the parts when the pressure in the tire has exceeded the maximum whereby over-inflation of the tire is obviated, and a grasping member carried by the inflating valve to prevent strain on the movable element when attaching or removing an inflating tube.

11. In a maximum pressure safety inflating gage adapted for application to a body containing air under pressure, an attaching member, a casing mounted in said member and extending in contact with an inner wall thereof, a tube in the bottom portion of said attaching member for communication with the interior of said body, an element longitudinally movable in the casing but held against rotation, said movable element comprising two sections connected to move simultaneously, a piston having an enlargement, a sleeve carried by the casing and movably receiving the piston through the medium of its enlargement, said piston being limited in its movement forwardly under the action of the air pressure and coöperating with one of said sections to prevent the escape of air from the body, and spring means contained in the casing and coöperating with the piston and movable element to cause said parts to remain in said positions at and below a maximum pressure and permitting the same to separate to permit the escape of air beyond a maximum pressure.

12. In a maximum pressure safety inflating gage adapted for application to a body containing air under pressure, an attaching member, a casing mounted in said member and extending in contact with an inner wall thereof, a tube in the bottom portion of said attaching member for communication with the interior of said body, an element longitudinally movable in the casing but held against rotation, said movable element comprising two sections connected to move simultaneously, a piston having an enlargement, a sleeve carried by the casing and movably receiving the piston through the medium of its enlargement, said piston being limited in its movement forwardly under the action of the air pressure and coöperating with one of said sections to prevent the escape of air from the body, spring means contained in the casing and coöperating with the piston and movable element to cause said parts to remain in said positions at and below a maximum pressure and permitting the same to separate to permit the escape of air beyond a maximum pressure, said casing and one section of the movable element having openings therein, the movable element having an indication and the piston having graduations adjacent to the opening with which the indication coöperates to indicate the internal pressure up to a maximum, and a cap attached to the attaching part to inclose the casing and other parts.

13. In a maximum pressure safety inflating gage adapted for application to a body containing air under pressure, an attaching member, a casing mounted in said member and extending in contact with an inner wall thereof, a tube in the bottom portion of said attaching member for communication with the interior of said body, an element longitudinally movable in the casing but held against rotation, said movable element and casing having openings therein, the openings of the casing bearing graduations along their edges and the movable element having indications coöperating with the graduations to indicate the internal pressure of the body, a sleeve having an enlargement fixed to the casing and having a reduced portion extending into the casing, a piston movable in the sleeve and limited in its movement forwardly, packing means between the piston and the surrounding wall of the sleeve, spring means between the movable element and the enlargement of the sleeve, spring means between the movable element and the top of the casing, said spring means causing the coöperation of the movable element and the piston to prevent the escape of air through the passage thus produced, an inflating valve at the end of the passage permitting the inflating of the body for preventing the escape of the air under pressure, and spring means between the piston and movable element acting against the first mentioned spring means and compressed while the other spring means are expanded to permit movement of the piston and movable element to disengage the same from each other and permit the escape of air when the same has reached a predetermined pressure.

14. In a maximum pressure safety inflating gage adapted for application to a body containing air under pressure, an attaching member, a casing mounted in said member and extending in contact with an inner wall thereof, a tube in the bottom portion of said attaching member for communication with the interior of said body, an element longitudinally movable in the casing or held against rotation, said movable element and casing having openings therein, the openings of the casing bearing graduations along their edges and the movable element having indications coöperating with the graduations to indicate the longitudinal pressure of the body, a sleeve having an enlargement fixed to the casing and having a reduced portion extending into the casing, a piston movable in the sleeve and limited in its movement forwardly, means to cushion the movement of the piston at its forward limit, packing means between the piston and the surrounding wall of the sleeve, spring means between the movable element and the enlargement of the sleeve, spring means between the movable element and the top of the casing, said spring means causing the co-operation of the movable element and the piston to prevent the escape of air through the passage thus produced, an inflating valve at the end of the passage permitting the inflating of the body for preventing the escape of the air under pressure, spring means between the piston and movable element acting against the first mentioned spring means and compressed while the other spring means are expanded to permit movement of the piston and movable element to disengage the same from each other and permit the escape of air when the same has reached a predetermined pressure, means for adjusting the tension of said spring means, a grasping member on the inflating valve carrying member, a covering for said member, and a cap over said parts.

15. A maximum pressure safety inflating tire gage, comprising a barrel interiorly threaded to engage an attaching stem of an inner tube, said barrel being exteriorly threaded, a securing nut threaded on the barrel, a cap also threaded on the barrel, a partition in the barrel forming upper and lower hollowed-out portions, packing means in the lower hollowed-out portion to form an air-tight connection with the attaching stem, a casing fixed in the barrel and depending into the same, a sleeve extending partially into the casing and having an enlargement fitting in the lower end of the casing and limited in its movement therein, means for securing the sleeve against movement in the casing, a packing washer between the enlargement and the end wall of the other hollowed-out portion of the casing, a stop member in the upper end of the sleeve restricting the bore thereof, a piston having a reduced portion passing through the stop member and having an enlargement movable in the sleeve, the piston having a bore therethrough, expansible cup washers carried by the enlargement to form an air-tight connection with the interior wall of the sleeve, cushioning means carried by the enlargement to engage the stop member, a cylinder slidably engaged with the sleeve exteriorly, a tubular section threaded to the cylinder and splined to the inner wall of the casing, a partition in the tubular section terminating in a depending flange and an upwardly extending inflating stem, an inflating valve in the stem, all of said parts being inclosed in the cap, a disk carried by the piston and having a seat, a tip also carried by the piston and extending up into the inflating stem, a contractile spring connected to the cylinder and the enlargement and encircling the sleeve, an expansible spring between the partition of the tubular section and the free end of the casing coöperating with the contractile spring to hold the flange in engagement with the seat of the disk whereby the escape of air under pressure is prevented, there being a continuous passage communicating with the tube to permit inflating of the latter through the inflating valve, and a spring between the disk and cylinder adapted to be compressed upon the pressure in the tube exceeding a maximum whereby the flange will disengage from the seat to permit the escape of air preventing excessive inflating of the tube, said cylinder, casing and cap having openings through which said air escapes and the tubular section coöperating with the casing to indicate the internal pressure of the tube.

16. The combination with a tire having an inner tube adapted to be inflated; of a threaded attaching stub clamped to the tube and projecting slightly from the tire, a rim to which the tire is attached, a felly on which said rim is mounted, said rim and felly having alined apertures into which the attaching stub slightly projects with a surrounding space therebetween, and a gage for relieving the tire of excessive pressure, said gage having an attaching barrel extending loosely through the apertures and being connected to the stub near the outer edge of the felly, said barrel having an exteriorly threaded part and a nut threaded thereon with a flange extending snugly into the aperture of the felly whereby the gage is held against movement and undue strain on the attaching stub and inner tube prevented.

17. The combination with a tire having an inner tube adapted to be inflated; of a threaded attaching stub clamped to the tube and projecting slightly from the tire, a rim to which the tire is attached, a felly on which said rim is mounted, said rim and felly having alined apertures into which the attaching stub projects through the rim and into the felly, a gage for relieving the tire of excessive pressure, said gage having an attaching barrel extending through the apertures of the felly and rim with a space between it and the walls of the apertures and being connected to the stub near the peripheral edge of the felly, said barrel having an exteriorly threaded part and a nut threaded thereon with a flange extending into the apertures of the felly and with its engaging part outwardly of the aperture whereby the gage is held against movement and undue strain on the attaching stub and inner tube prevented, and a cap threaded on the barrel to contact with the nut and inclose the working parts of the gage.

18. A maximum pressure safety inflating tire gage, comprising mechanism to relieve a tire or similar body of excessive internal air pressure but adapted to permit the inflation of the tire therethrough, said mechanism including an inflating valve held in a balanced position, means movable independently of the valve and disposed inwardly thereof to normally prevent the escape of air below said excessive pressure but actuated upon the existence of excessive pressure to relieve the same, and means to indicate the internal pressure of the tire at all times, said means including a part carried by the valve and a casing held from movement outwardly of said part and having a plurality of elongated openings therethrough, said casing being graduated adjacent to said openings and the last named stationary part being provided with indications coöperating with said graduations whereby the pressure in the tire at and below a maximum may be determined.

19. A maximum pressure safety inflating tire gage, comprising mechanism to relieve a tire or similar body of excessive internal air pressure but adapted to permit the inflation of the tire therethrough, said mechanism, including an inflating valve held in a balanced position, means movable independently of the valve and disposed inwardly thereof to normally prevent the escape of air below said excessive pressure but actuated upon the existence of excessive pressure to relieve the same, means to indicate the internal pressure of the tire at all times, said means including a part carried by the valve and a casing held from movement outwardly of said part and having a plurality of elongated openings therethrough, said casing being graduated adjacent to said openings and the last named stationary part being provided with indications coöperating with said graduations whereby the pressure in the tire at and below a maximum may be determined, and means carried by said casing and coöperating with the valve and part carried thereby to regulate the existing balance whereby the device may be set to withstand any desired pressure and to relieve pressure excessive thereto.

In testimony whereof I have signed my name to this specification in the presence of two subscribing witnesses.

SEAMAN PARTERSUS NOE.

Witnesses:
SAMUEL B. NOE,
JOHN E. BURCH.